(12) United States Patent
Lee et al.

(10) Patent No.: US 11,409,706 B2
(45) Date of Patent: Aug. 9, 2022

(54) DOCUMENT COOPERATION SUPPORTING APPARATUS FOR SUPPORTING SIMULTANEOUS EDIT OF DOCUMENT, AND OPERATING METHOD THEREOF

(71) Applicant: HANCOM INC., Seongnam-si (KR)

(72) Inventors: Taeju Lee, Yongin-si (KR); Yongkyung Oh, Yongin-si (KR); Kyury Kim, Seoul (KR)

(73) Assignee: HANCOM INC., Seongnam-si (KR)

( * ) Notice: Subject to any disclaimer, the term of this patent is extended or adjusted under 35 U.S.C. 154(b) by 324 days.

(21) Appl. No.: 15/525,587

(22) PCT Filed: Aug. 4, 2016

(86) PCT No.: PCT/KR2016/008591
§ 371 (c)(1),
(2) Date: Aug. 27, 2018

(87) PCT Pub. No.: WO2018/026033
PCT Pub. Date: Feb. 8, 2018

(65) Prior Publication Data
US 2019/0129889 A1 May 2, 2019

(51) Int. Cl.
*G06F 16/176* (2019.01)
*G06F 40/166* (2020.01)
*G06F 40/197* (2020.01)

(52) U.S. Cl.
CPC ........ *G06F 16/1767* (2019.01); *G06F 40/166* (2020.01); *G06F 40/197* (2020.01)

(58) Field of Classification Search
CPC ... G06F 16/1767; G06F 40/166; G06F 40/197
See application file for complete search history.

(56) References Cited

U.S. PATENT DOCUMENTS 5,787,262 A * 7/1998 Shakib ............... G06F 9/52
709/205
7,899,883 B2 * 3/2011 Rasmussen ........... G06F 40/197
709/217
(Continued)

FOREIGN PATENT DOCUMENTS

CN 107943777 A * 4/2018
CN 107943777 B * 7/2021
(Continued)

OTHER PUBLICATIONS

Ellis, C.A. et al. "Concurrency Control in Groupware Systems", 1989 Association for Computing Machinery. (Year: 1989).*
(Continued)

*Primary Examiner* — Andrew R Dyer
*Assistant Examiner* — Tyler Schallhorn
(74) *Attorney, Agent, or Firm* — Park, Kim & Suh, LLC

(57) ABSTRACT

A document cooperation supporting apparatus for supporting a simultaneous edit of a document according to an exemplary embodiment of the present invention, and an operating method thereof sequentially transmit edit commands to each of the client terminals based on a reception sequence of the edit commands when the simultaneously generated edit commands are received from the plurality of client terminals, and performs an operational transformation on edit commands having later reception sequences to provide a cooperation environment enabling users to simultaneously edit the document.

7 Claims, 3 Drawing Sheets

(56) References Cited

U.S. PATENT DOCUMENTS

| | | | |
|---|---|---|---|
| 8,484,561 B1* | 7/2013 | Lemonik | G06Q 10/101 |
| | | | 715/255 |
| 8,732,247 B2* | 5/2014 | Dittmer-Roche | H04L 65/4015 |
| | | | 709/205 |
| 8,909,596 B1 | 12/2014 | Zhang et al. | |
| 9,063,949 B2* | 6/2015 | Zhai | G06F 16/1767 |
| 9,348,803 B2* | 5/2016 | Vagell | G06F 40/106 |
| 9,529,785 B2* | 12/2016 | Vagell | G06F 40/166 |
| 9,971,752 B2* | 5/2018 | Vagell | G06F 40/169 |
| 10,078,805 B2* | 9/2018 | Westlake | G06Q 10/063114 |
| 10,171,581 B2* | 1/2019 | Nelson | G06F 16/178 |
| 2009/0313331 A1* | 12/2009 | Rasmussen | G06F 40/197 |
| | | | 709/205 |
| 2011/0078246 A1* | 3/2011 | Dittmer-Roche | G06F 40/197 |
| | | | 709/205 |
| 2011/0252312 A1 | 10/2011 | Lemonik et al. | |
| 2011/0296317 A1* | 12/2011 | Ishihara | G06Q 10/10 |
| | | | 715/753 |
| 2013/0339847 A1 | 12/2013 | Bartek et al. | |
| 2014/0279842 A1* | 9/2014 | Zhai | G06F 40/197 |
| | | | 707/608 |
| 2015/0052427 A1* | 2/2015 | Vagell | G06F 40/166 |
| | | | 715/256 |
| 2015/0081367 A1* | 3/2015 | Westlake | G06Q 10/06311 |
| | | | 705/7.15 |
| 2015/0113390 A1* | 4/2015 | Vagell | G06F 40/106 |
| | | | 715/255 |
| 2015/0193404 A1* | 7/2015 | Danziger | G06F 40/197 |
| | | | 715/229 |
| 2015/0199319 A1 | 7/2015 | Newman et al. | |
| 2016/0173594 A1* | 6/2016 | Nelson | H04L 67/1095 |
| | | | 709/205 |
| 2017/0359444 A1* | 12/2017 | To | H04L 67/1095 |
| 2018/0260368 A1* | 9/2018 | Vagell | G06F 16/176 |

FOREIGN PATENT DOCUMENTS

| | | |
|---|---|---|
| KR | 10-2012-0039514 A | 4/2012 |
| KR | 10-2013-0064570 A | 6/2013 |
| KR | 10-1504719 B1 | 3/2015 |
| WO | 2009/079116 A2 | 6/2009 |
| WO | 2010/111248 A2 | 9/2010 |
| WO | 2011/119861 A1 | 9/2011 |
| WO | 2013/148382 A1 | 10/2013 |

OTHER PUBLICATIONS

Day-Richter, John. "What's different about the new Google Docs: Working together, even apart", Sep. 21, 2010. (Year: 2010).*
Day-Richter, John. "What's different about the new Google Docs: Conflict resolution", Sep. 22, 2010. (Year: 2010).*
Day-Richter, John. "What's different about the new Google Docs: Making collaboration fast", Sep. 23, 2010. (Year: 2010).*
Imine, Abdessamad. "Flexible Concurrency Control for Real-time Collaborative Editors", Jul. 25, 2008, IEEE. (Year: 2008).*
Korean Office Action in Appln. No. 10-2017-7000818 dated Feb. 19, 2017 with English Translation.
International Search Report in International Application No. PCT/KR2016/008591 dated Apr. 27, 2017 with English translation, 7pages.

* cited by examiner

DOCUMENT COOPERATION SUPPORTING APPARATUS FOR SUPPORTING SIMULTANEOUS EDIT OF DOCUMENT, AND OPERATING METHOD THEREOF

CROSS-REFERENCE TO RELATED APPLICATIONS

This application is the National Stage filing under 35 U.S.C. 371 of International Application No. PCT/KR2016/008591, filed on Aug. 4, 2016, the contents of which are all hereby incorporated by reference in their entirety.

TECHNICAL FIELD

The present invention relates to a technology for an apparatus for supporting document cooperation, which supports a plurality of users to simultaneously edit a document, and an operating method thereof.

BACKGROUND ART

Recently, according to the wide supply of electronic terminal devices, such as a computer, a smart phone, or a tablet PC, various kinds of electronic document-related programs, with which a user may read, write, and edit an electronic document by using the electronic terminal device, have been released.

The electronic document-related programs include a word processor supporting basic writing and editing of a document, a spread sheet assisting data input, calculation, and a data management, and presentation programs assisting a presentation of a speaker.

In the related art, in order for a user to read, write, and edit an electronic document by utilizing an electronic terminal device, the user needs to directly install the electronic document-related programs in the electronic terminal device, drive the electronic document-related programs, and read or write and edit the electronic document.

However, recently, a high speed Internet environment is established and a wireless Internet environment, in which a user is capable of accessing the Internet anytime and anywhere, is established, and an electronic document-related service is provided to an electronic terminal device that is a client terminal through a server in a remote place, so that a web-based electronic document service, which enables a user to read, write, and edit an electronic document anytime and anywhere even though the user does not install a predetermined electronic document-related program in an electronic terminal device, appears.

The web-based electronic document service supports various client terminals to access an electronic document service providing server, and then to read, write, and edit an electronic document through a browser installed in the client terminals, and supports various client terminals to act simultaneous cooperation in real time for the electronic document, so that the web-based electronic document service is mainly utilized in a company, a group, and the like.

The web-based electronic document service supports a user to read, write, and edit an electronic document through a browser installed in a client terminal if the client terminal can access the Internet, without the necessity for installing a predetermined electronic document writing program in the client terminal, so that it is possible to secure mobility for a user, thereby gradually increasing individual users.

Commonly, in order to support a client terminal connected through a network to perform editing of an electronic document through a browser, the web-based electronic document service is operated in a method, in which when an original electronic document is converted into a markup language-based document and the converted document is provided to the client terminal, the client terminal performs editing of the markup language-based document through the browser.

In a document cooperation environment, since the plurality of users performs the edit of one document at the same time, a conflict may be incurred between editing commands input from the respective users, and there is a technology called operational transformation as a technology for solving the conflict.

The operational transformation is a method, in which when the plurality of users edits one document at the same time, and thus a conflict that is an incompatible situation is generated between the editing commands in the document, the conflict is solved and a reflection position of each editing command in the document and the like are adjusted so that all of the editing commands are reflected in the document.

For example, it is assumed that there is a document, in which text "abc" is inserted, and user 1 and user 2 participates in a cooperation session for the document through their client terminals, and user 1 performs an edit of inserting "e" between "ab" and "c" through his/her client terminal and user 2 performs an edit of deleting "c" at the same time.

In this case, the operational transformation technology is a technology, which simultaneously reflects the edits generated from the client terminal of user 1 and the client terminal of user 2 to a document displayed through the client terminal of user 1 and a document displayed on the client terminal of user 2 and helps the document displayed through the client terminal of user 1 and the document displayed through the client terminal of user 2 to be maintained in the same edit state of "abe" to support the simultaneous edit of the document.

In respect that the operational transformation technology is a method, in which when the conflicting edit commands are simultaneously generated in one document, a position of an application of another edit command in the document is changed based on any one edit command among the edit commands, in order to support a simultaneous edit of a document by using the operational transformation technology in a document cooperation environment, it is necessary to introduce an edit command processing algorithm of determining, when edit commands are simultaneously generated in one document, an edit command, based on which the operational transformation is performed, and appropriately performing the operational transformation based on the determined edit command to appropriately apply all of the edit commands, which conflict with one another, to a cooperation target document.

SUMMARY OF THE INVENTION

The present invention has been made in an effort to provide a document cooperation supporting apparatus, which supports a simultaneous edit of a document, and an operating method thereof, in which when simultaneously generated edit commands are received from a plurality of client terminals, respectively, the edit commands are sequentially transmitted to the client terminals based on a reception sequence of the edit commands, and an operational transformation is performed on the edit commands, which are received late, so that when each of the client terminals applies each of the edit commands, which is sequentially received from the document cooperation supporting apparatus for supporting the simultaneous edit of the document, to the document stored in each of the client terminals, edit states of the documents stored in the client terminals are made to be the same to provide a cooperation environment, in which a coedit of the document is available.

Technical Solution

An exemplary embodiment of the present invention provides an apparatus for supporting document cooperation, which supports a simultaneous edit of a document, the apparatus including: an edit command receiving unit configured to, which when edit commands related to an edit of a document are simultaneously applied by a plurality of client terminals participating in a cooperation session of the document, receive the edit commands (in each of the edit commands, a coordinate value associated with a position of an application of each edit command in the document is defined) simultaneously applied for the document from the plurality of client terminals, respectively; and an edit command processing unit configured to sequentially transmit the edit commands received from the plurality of client terminals, respectively, to the plurality of client terminals one by one according to a reception sequence of the edit commands, and when, for an edit command of a present turn to be transmitted to the plurality of client terminals, there is an edit command of a previous turn that is received earlier than the edit command of the present turn, perform an operational transformation on a coordinate value of a position, to which the edit command of the present turn is to be applied, in the document, based on a coordinate value associated with a position of an application of the edit command of the previous turn in the document, and then transmit the edit command of the present turn, of which the operational transformation is completed, to the plurality of client terminals.

Another exemplary embodiment of the present invention provides a method of operating an apparatus for supporting document cooperation, which supports a simultaneous edit of a document, the method including: when edit commands related to an edit of a document are simultaneously applied by a plurality of client terminals participating in a cooperation session of the document, receiving the edit commands (in each of the edit commands, a coordinate value associated with a position of an application of each edit command in the document is defined) simultaneously applied for the document from the plurality of client terminals, respectively; and sequentially transmitting the edit commands received from the plurality of client terminals, respectively, to the plurality of client terminals one by one according to a reception sequence of the edit commands, and when, for an edit command of a present turn to be transmitted to the plurality of client terminals, there is an edit command of a previous turn that is received earlier than the edit command of the present turn, performing an operational transformation on a coordinate value of a position, to which the edit command of the present turn is to be applied in the document, based on a coordinate value associated with a position of an application of the edit command of the previous turn in the document, and then transmitting the edit command of the present turn, of which the operational transformation is completed, to the plurality of client terminals.

Advantageous Effects

According to the document cooperation supporting apparatus for supporting a simultaneous edit of a document and the operating method thereof according to the present invention, when simultaneously generated edit commands are received from a plurality of client terminals, respectively, each of the edit commands are sequentially transmitted to the client terminals based on a reception sequence of the edit commands, and an operational transformation is performed on the edit commands, which have the later reception sequence, so that when each of the client terminals applies the edit commands, which are sequentially received from the document cooperation supporting apparatus for supporting the simultaneous edit of the document, to the document stored in each of the client terminals, edit states of the documents stored in the client terminals are made to be the same to enable a plurality of users to simultaneously edit one document.

Particularly, in the present invention, each of the client terminals participating in the document cooperation does not perform the operational transformation on the edit commands, but the document cooperation supporting apparatus for supporting the simultaneous edit of the document receives an edit command from each of the client terminals, performs the operational transformation on all of the received edit commands, and then distributes the edit commands, of which the operational transformation is completed, to each of the client terminals, so that it is not necessary to install a separate program engine for the operational transformation in each of the client terminal, thereby providing an environment enabling a document join cooperation even by using a client terminal having relatively low performance.

DETAILED DESCRIPTION

Figure 1:
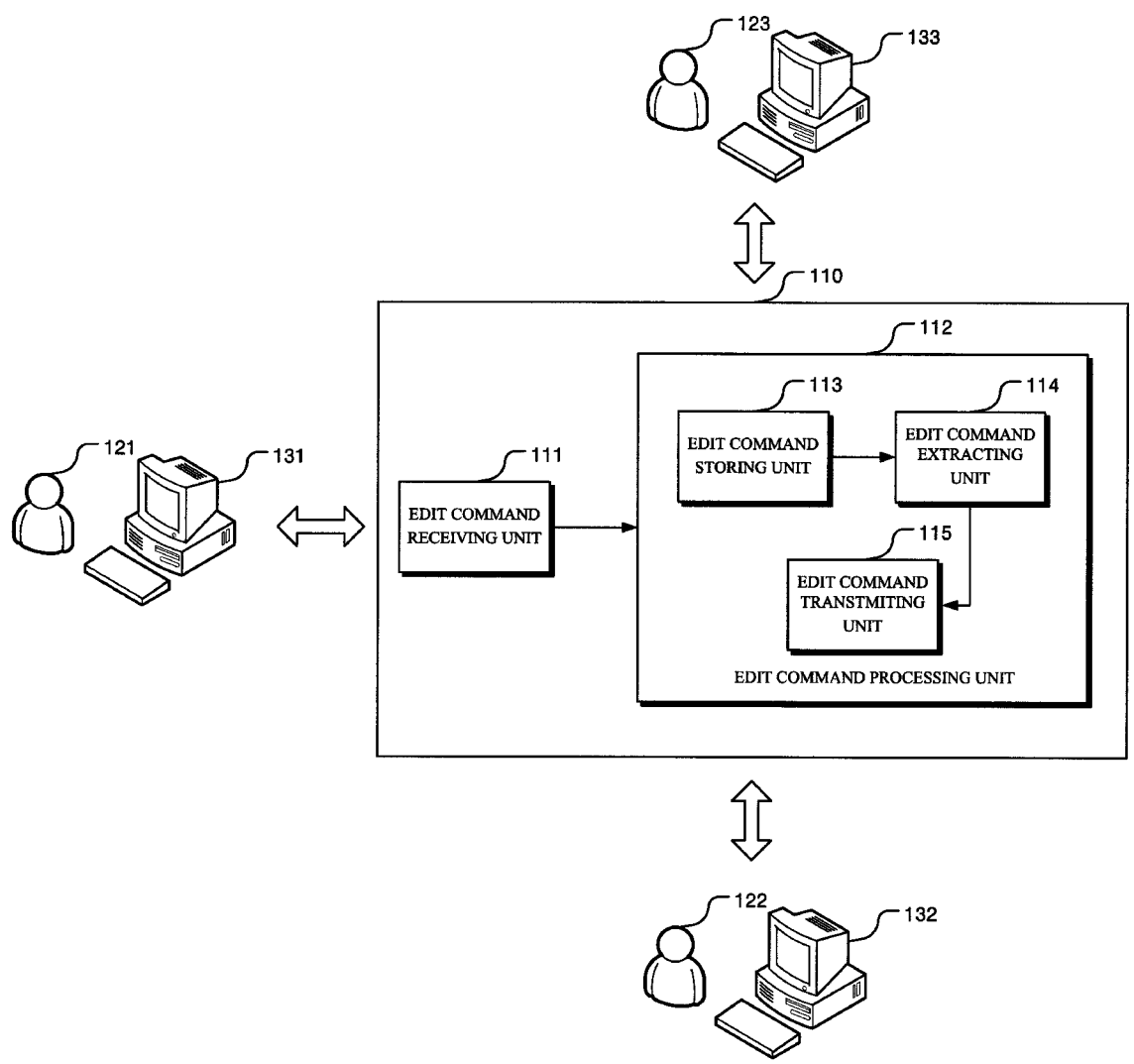
FIG. 1 is a diagram illustrating a structure of a document cooperation supporting apparatus for supporting a simultaneous edit of a document according to an exemplary embodiment of the present invention.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

In the case where a component is referred to as being "connected" or "accessed" to another component, it should be understood that the component may not only be directly connected or accessed to the other component, but also there may exist another component between them. In contrast, when one element is "directly coupled to" or "directly connected to" another element, it should be understood that there is no intervening element present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, constituent elements, and elements described in the specification or a combination thereof, and do not exclude a possibility of the existence or addition of one or more other characteristics, numbers, steps, operations, constituent elements, and elements, or a combination thereof in advance.

All terms used herein including technical or scientific terms have the same meanings as meanings which are generally understood by those skilled in the art unless they are differently defined. Terms defined in a generally used dictionary shall be construed that they have meanings matching those in the context of a related art, and shall not be construed in ideal or excessively formal meanings unless they are clearly defined in the present application.

Hereinafter, exemplary embodiments of the present invention will be described in detail with reference to the accompanying drawings.

FIG. 1 is a diagram illustrating a structure of a document cooperation supporting apparatus for supporting a simultaneous edit of a document according to an exemplary embodiment of the present invention.

Referring to FIG. 1, a document cooperation supporting apparatus 110 for supporting a simultaneous edit of a document according to an exemplary embodiment of the present invention includes an edit command receiving unit 111 and an edit command processing unit 112.

When edit commands related to an edit of a document are simultaneously applied by a plurality of client terminals 131, 132, and 133 participating in a cooperation session of the document, the edit command receiving unit 111 receives the edit commands (in each of the edit commands, a coordinate value associated with a position of an application of each edit command in the document is defined) simultaneously applied for the document from the plurality of client terminals 131, 132, and 133, respectively.

The edit command processing unit 112 sequentially transmits the edit commands received from the plurality of client terminals 131, 132, and 133, respectively, to the plurality of client terminals 131, 132, and 133 one by one according to a reception sequence of the edit commands, and when, for an edit command of a present turn to be transmitted to the plurality of client terminals 131, 132, and 133, there is an edit command of a previous turn that is received earlier than the edit command of the present turn, the edit command processing unit 112 performs an operational transformation on a coordinate value of a position, to which the edit command of the present turn is to be applied, in the document, based on a coordinate value associated with a position of an application of the edit command of the previous turn in the document, and then transmits the edit command of the present turn, of which the operational transformation is completed, to the plurality of client terminals.

In this case, according to the exemplary embodiment of the present invention, the edit command processing unit 112 may include an edit command storing unit 113, an edit command extracting unit 114, and an edit command transmitting unit 115.

The edit command storing unit 113 stores the edit commands received from the plurality of client terminals 131, 132, and 133 in a queue of a buffer based on a reception sequence of the edit commands.

When all of the edit commands are stored in the queue of the buffer, the edit command extracting unit 114 extracts the edit commands one by one from the queue of the buffer according to a storage sequence from the queue of the buffer.

The edit command transmitting unit 115 transmits the edit commands extracted one by one to the plurality of client terminals 131, 132, and 133 whenever the edit commands are extracted one by one from the queue of the buffer, and when there is an edit command of the previous turn stored earlier in the queue of the buffer than an edit command of the present turn for the edit command of the present turn to be transmitted to the plurality of client terminals 131, 132, and 133, the edit command transmitting unit 115 performs the operational transformation on a coordinate value of a position, to which the edit command of the present turn is to be applied, in the document based on a coordinate value associated with a position of an application of the edit command of the previous turn in the document, and then transmits the edit command of the present turn, of which the operational transformation is completed, to the plurality of client terminals 131, 132, and 133.

According to the exemplary embodiment of the present invention, the plurality of client terminals 131, 132, and 133 stores the documents within the plurality of client terminals 131, 132, and 133, respectively, and when the edit commands are sequentially received from the document cooperation supporting apparatus 110 for supporting the simultaneous edit of the document one by one, the plurality of client terminals 131, 132, and 133 may apply edits according to each of the received edit commands to the documents stored in the plurality of client terminals 131, 132, and 133 based on the coordinate value defined in each of the received edit commands and associated with the position of the application of each of the edit commands in the document.

In this case, according to the exemplary embodiment of the present invention, when the edit commands are simultaneously applied by users 121, 122, and 123 of the plurality of client terminals 131, 132, and 133 for the document stored in each of the plurality of client terminals 131, 132, and 133, each of the plurality of client terminals 131, 132, and 133 may autonomously apply edits according to the edit command applied by each of the users 121, 122, and 123 of the plurality of client terminals 131, 132, and 133 to the document stored in each of the plurality of client terminals 131, 132, and 133, and each of the plurality of client terminals 131, 132, and 133 may transmit the edit command applied by each of the users 121, 122, and 123 to the document cooperation supporting apparatus 110 for supporting the simultaneous edit of the document.

In this case, according to the exemplary embodiment of the present invention, when the edit commands are sequentially received one by one from the document cooperation supporting apparatus 110 for supporting the simultaneous edit of the document, each of the plurality of client terminals 131, 132, and 133 may determine whether there is the same edit command as the edit command, which has been already autonomously applied to the document stored in each of the plurality of client terminals 131, 132, and 133, among the received edit commands, and when it is determined that there is the same edit command, each of the plurality of client terminals 131, 132, and 133 may exclude the same edit command from the received edit commands, and then apply the edits according to the received edit commands to the document stored in each of the plurality of client terminals 131, 132, and 133 based on a coordinate value associated with a position of an application of each of the edit commands in the document defined in each of the received edit commands.

Hereinafter, an operation of the document cooperation supporting apparatus 110 for supporting the simultaneous edit of the document according to the present invention will be described in detail with an example with reference to FIG. 2.

First, for convenience of the description, it is assumed that the client terminal 131 of user 1 121, the client terminal 132 of user 2 122, and the client terminal 133 of user 3 123 access the document cooperation supporting apparatus 110 for supporting the simultaneous edit of the document and simultaneously edit a document. Further, it is assumed that each of the plurality of client terminals 131, 132, and 133 simultaneously edits the document based on a web-page through a browser installed in each of the plurality of client terminals 131, 132, and 133.

First, when an access request for an edit of an original document that is a cooperation target stored in a predetermined document storage is received from the client terminal 131 of the user 1 121, the client terminal 132 of the user 2 122, and the client terminal 133 of the user 3 123, the document cooperation supporting apparatus 110 for supporting the simultaneous edit of the document may convert the original document into a markup language-based document, and transmit the markup language-based document to the client terminal 131 of the user 1 121, the client terminal 132 of the user 2 122, and the client terminal 133 of the user 3 123.

In the present exemplary embodiment, it is assumed that text "1234" is inserted into the original document.

The markup language-based document means a document formed of a markup language, such as a hypertext markup language (HTML) or an eXtensible markup language (XML), readable through a browser installed in a client terminal.

For example, when an access request for an original document is received from the client terminal 131 of the user 1 121, the client terminal 132 of the user 2 122, and the client terminal 133 of the user 3 123 in the state where the original document having an extension, such as "hwp" or "docx", is stored in a predetermined document storage, the document cooperation supporting apparatus 110 for supporting the simultaneous edit of the document may extract the original document from the document storage and convert the original document into a document based on a markup language, such as "HTML", and then transmit the converted markup language-based document to the client terminal 131 of the user 1 121, the client terminal 132 of the user 2 122, and the client terminal 133 of the user 3 123.

In this case, according to the exemplary embodiment of the present invention, the document storage, in which the original document is stored, may be embedded inside the document cooperation supporting apparatus 110 for supporting the simultaneous edit of the document, and may also be formed of a stand alone-based device separated from the document cooperation supporting apparatus 110 for supporting the simultaneous edit of the document.

In this case, when the client terminal 131 of the user 1 121 receives the markup language-based document from the document cooperation supporting apparatus 110 for supporting the simultaneous edit of the document, the client terminal 131 of the user 1 121 may display the markup language-based document through browser 1 installed in the client terminal 131 of the user 1 121 as denoted with reference numeral 211.

Similarly, when the client terminal 132 of the user 2 122 receives the markup language-based document from the document cooperation supporting apparatus 110 for supporting the simultaneous edit of the document, the client terminal 132 of the user 2 122 may display the markup language-based document through browser 2 installed in the client terminal 132 of the user 2 122 as denoted with reference numeral 221.

When the client terminal 133 of the user 3 123 receives the markup language-based document from the document cooperation supporting apparatus 110 for supporting the simultaneous edit of the document, the client terminal 133 of the user 3 123 may display the markup language-based document through browser 3 installed in the client terminal 133 of the user 3 123 as denoted with reference numeral 231.

In this case, when edit command 1 commanding to insert text "a" to a leftmost point of "1234" is input by the client terminal 131 of the user 1 121 for the markup language-based document displayed through the browser 1 as denoted with reference numeral 212, and simultaneously, edit command 2 commanding to insert text "b" to a leftmost point of "1234" is input by the client terminal 132 of the user 2 122 for the markup language-based document displayed through the browser 2 as denoted with reference numeral 222, and edit command 3 commanding to insert text "c" to a leftmost point of "1234" is input by the client terminal 133 of the user 3 123 for the markup language-based document displayed through the browser 3 as denoted with reference numeral 232, the client terminal 131 of the user 1 121 may apply edits according to the edit command 1 to the markup language-based document displayed through the browser 1, and insert the text "a" to the leftmost point of "1234" as denoted with reference numeral 212 and then transmit the edit command 1 to the document cooperation supporting apparatus 110 for supporting the simultaneous edit of the document, the client terminal 132 of the user 2 122 may apply edits according to the edit command 2 to the markup language-based document displayed through the browser 2, and insert the text "b" to the leftmost point of "1234" as denoted with reference numeral 222 and then transmit the edit command 2 to the document cooperation supporting apparatus 110 for supporting the simultaneous edit of the document, and the client terminal 133 of the user 3 123 may apply edits according to the edit command 3 to the markup language-based document displayed through the browser 3, and insert the text "c" to the leftmost point of "1234" as denoted with reference numeral 232 and then transmit the edit command 3 to the document cooperation supporting apparatus 110 for supporting the simultaneous edit of the document.

In this case, the edit command receiving unit 111 may receive the edit commands 1, 2, and 3, which are simultaneously generated by the client terminal 131 of the user 1 121, the client terminal 132 of the user 2 122, and the client terminal 133 of the user 3 123 from the plurality of client terminals 131, 132, and 133, respectively.

In this case, according to the exemplary embodiment of the present invention, a coordinate value associated with a position of an application of each edit command in the markup language-based document may be defined in each of the edit commands 1, 2, and 3.

For example, it is assumed that a coordinate value of a position of an application of an edit command in the markup language-based document is defined as [x, y], and x is a coordinate of a start point of text and y is a coordinate of an end point of the text.

In this case, when it is assumed that a coordinate is allocated in the manner that the coordinate starts from 0 and is increased by one in a right direction starting at a leftmost point, at which the text is positioned in the markup language-based document, the edit commands 1, 2, and 3 are the edit commands commanding to insert "a", "b", and "c" to the leftmost part in the markup language-based document, respectively, so that the coordinates of both the start point and the end point, to which each edit command is applied in the markup language-based document, are 0.

Accordingly, the coordinate value [0, 0] may be defined in all of the edit commands 1, 2, and 3.

When the edit command receiving unit 111 receives the edit commands 1, 2, and 3 from the plurality of client terminals 131, 132, and 133, respectively, the edit command storing unit 113 included in the edit command processing unit 112 may sequentially store the edit commands 1, 2, and 3, which are received from the plurality of client terminals 131, 132, and 133, respectively, in the queue of the buffer based on a reception sequence of edit commands 1, 2, and 3 as denoted with reference numeral 210.

For example, when the edit command 2 is first received in the edit command receiving unit 111, the edit command 1 is next received in the edit command receiving unit 111, and the edit command 3 is last received in the edit command receiving unit 111, the edit command storing unit 113 may first store the edit command 2 commanding to insert "b" in the queue of the buffer, store the edit command 1 commanding to insert "a" in the queue of the buffer in a next sequence, and last store the edit command 3 commanding to insert "c" in the queue of the buffer, as denoted with reference numeral 210.

When all of the edit commands 1, 2, and 3 are stored in the queue of the buffer, the edit command extracting unit 114 may sequentially extract the edit commands 2, 1, and 3 from the queue of the buffer one by one according to the sequence of the storage of the edit commands 1, 2, and 3 in the queue of the buffer.

In this case, when the edit command 2 is first extracted from the queue of the buffer, the edit command transmitting unit 115 may determine whether there is an edit command of a previous turn stored earlier than the edit command 2 in the queue of the buffer.

The edit command 2 is the edit command first stored in the queue of the buffer, so that the edit command transmitting unit 115 may determine that there is no edit command of the previous turn stored earlier than the edit command 2 in the queue of the buffer, and in this case, the edit command transmitting unit 115 may not perform the operational transformation on the edit command 2 and transmit the edit command 2 to the plurality of client terminals 131, 132, and 133 without a change.

In this case, when the edit command 2 is received, the client terminal 131 of the user 1 121 may determine whether the same edit command as the edit command 2 is already applied to the markup language-based document, to which the edit "a1234" has been applied as denoted with reference numeral 212.

Since the same edit command as the edit command 2 is not applied to the markup language-based document, which is displayed through the browser 1 of the client terminal 131 of the user 1 121, the client terminal 131 of the user 1 121 may apply the edits according to the edit command 2 based on a coordinate value, which is defined in the edit command 2 and is associated with a position of an application of the edit command 2 in the markup language-based document, as denoted with reference numeral 213, and change the markup language-based document displayed through the browser 1 to include "ba1234".

That is, the coordinate value defined in the edit command 2 is [0, 0] and the edit command 2 is the edit command commanding to insert "b" to the leftmost point, so that the client terminal 131 of the user 1 121 may insert "b" to the leftmost point of "a1234" displayed through the browser 1 as denoted with reference numeral 212 to change an edit state of the markup language-based document displayed through the browser 1 to "ba1234" as denoted with reference numeral 213.

In the meantime, when the edit command 2 is received, the client terminal 132 of the user 2 122 may determine whether the same edit command as the edit command 2 is already applied to the markup language-based document, to which the edit "b1234" has been applied as denoted with reference numeral 222.

Since the same command as the edit command 2 has been already autonomously applied to the markup language-based document displayed through the browser 2 of the client terminal 132 of the user 2 122 as denoted with reference numeral 222, it is not necessary to apply the received edit command 2 to the markup language-based document again, so that the client terminal 132 of the user 2 122 may discard the received edit command 2 to maintain the edit state "b1234" without a change as denoted with reference numeral 223.

Last, when the edit command 2 is received, the client terminal 133 of the user 3 123 may determine whether the same edit command as the edit command 2 is already applied to the markup language-based document, to which the edit "c1234" has been applied as denoted with reference numeral 232.

Since the same edit command as the edit command 2 is not applied to the markup language-based document, which is displayed through the browser 3 of the client terminal 133 of the user 3 123, the client terminal 133 of the user 3 123 may apply the edits according to the edit command 2 based on the coordinate value, which is associated with the position of the application of the edit command 2 in the markup language-based document and is defined in the edit command 2, as denoted with reference numeral 233, and change the markup language-based document displayed through the browser 3 to include "bc1234".

That is, the coordinate value defined in the edit command 2 is [0, 0] and the edit command 2 is the edit command commanding to insert "b" to the leftmost point, so that the client terminal 133 of the user 3 123 may insert "b" to the leftmost point of "c1234" displayed through the browser 3 as denoted with reference numeral 232 to change an edit state of the markup language-based document displayed through the browser 3 to "bc1234" as denoted with reference numeral 233.

In this case, according to the exemplary embodiment of the present invention, each of the plurality of client terminals 131, 132, and 133 may generate a unique serial number corresponding to a corresponding edit command whenever a predetermined edit command is applied from each of the plurality of client terminals 131, 132, and 133.

Accordingly, when the edit command 2 is received from the document cooperation supporting apparatus 110 for supporting the simultaneous edit of the document, each of the plurality of client terminals 131, 132, and 133 may compare unique serial numbers of the edit commands, which have been already applied to the markup language-based document displayed through the browser of each of the plurality of client terminals 131, 132, and 133 with a unique serial number of the received edit command 2, and determine whether the same edit command as the received edit command 2 has been already applied to the markup language-based document.

When the edit command 2 is first extracted from the queue of the buffer and transmitted to the plurality of client terminals 131, 132, and 133, and then the edit command 1 is second extracted from the queue of the buffer, the edit command transmitting unit 115 may determine whether there is an edit command of a previous turn stored earlier than the edit command 1 in the queue of the buffer.

Since the edit command 2 is stored earlier than the edit command 1 in the queue of the buffer, the edit command transmitting unit 115 may determine that there is the edit command of the previous turn stored earlier than the edit command 1 in the queue of the buffer, and in this case, the edit command transmitting unit 115 may perform the operational transformation of changing a coordinate value associated with a position, to which the edit command 1 is to be applied in the markup language-based document, on the edit command 1 based on the coordinate value associated with the position of the application of the edit command 2, which is the edit command of the previous turn, in the markup language-based document.

In relation to this, since the coordinate value defined in the edit command 2 is [0, 0] and the coordinate value defined in the edit command 1 is also [0, 0], and thus the coordinate values, to which the edit command 1 and the edit command 2 are applied, overlap each other, the edit command transmitting unit 115 may change the coordinate value, to which the edit command 1 is applied, to a coordinate value [1, 1] by moving one space in a right direction for the edit command 1.

That is, since the points of the application of the edit command 2 commanding to insert "b" to the leftmost point and the edit command 1 commanding to insert "a" to the leftmost point are the same as each other in the markup language-based document, the edit command transmitting unit 115 may perform the operational transformation of changing the point of the application of the edit command 1 to a point shifted by one space from the leftmost point in the right direction on the edit command 1, which is stored late in the queue of the buffer.

Then, the edit command transmitting unit 115 may transmit the edit command 1, of which the operational transformation is completed, to each of the plurality of client terminals 131, 132, and 133.

In this case, when the edit command 1 is received, the client terminal 131 of the user 1 121 may determine whether the same edit command as the edit command 1 is already applied to the markup language-based document, to which the edit "ba1234" has been applied as denoted with reference numeral 213.

In this case, the client terminal 131 of the user 1 121 may determine whether the same edit command as the edit command 1 is already applied to the markup language-based document, to which the edit "ba1234" has been applied by confirming a unique serial number corresponding to the edit command 1.

Since the same edit command as the edit command 1 has been already autonomously applied to the markup language-based document displayed through the browser 1 of the client terminal 131 of the user 1 121 as denoted with the reference numeral 212, it is not necessary to apply the received edit command 1 to the markup language-based document again, so that the client terminal 131 of the user 1 121 may discard the received edit command 1 to maintain the edit state "ba1234" without a change as denoted with reference numeral 214.

In the meantime, when the edit command 1 is received, the client terminal 132 of the user 2 122 may determine whether the same edit command as the edit command 1 is already applied to the markup language-based document, to which the edit "b1234" has been applied as denoted with reference numeral 223.

In this case, the client terminal 132 of the user 2 122 may determine whether the same edit command as the edit command 1 is already applied to the markup language-based document, to which the edit "b1234" has been applied by confirming the unique serial number corresponding to the edit command 1.

Since the same edit command as the edit command 1 is not applied to the markup language-based document, which is displayed through the browser 2 of the client terminal 132 of the user 2 122, the client terminal 132 of the user 2 122 may apply edits according to the edit command 1 based on a coordinate value, which is defined in the edit command 1 and is associated with a position of an application of the edit command 1 in the markup language-based document, as denoted with reference numeral 224, and change the markup language-based document displayed through the browser 2 to include "ba1234".

That is, the coordinate value defined in the edit command 1 is [1, 1] and the edit command 1 is the edit command commanding to insert "a" to the second left point, so that the client terminal 132 of the user 2 122 may insert "a" to the second left point in "b1234" displayed through the browser 2 as denoted with reference numeral 223 to change an edit state of the markup language-based document displayed through the browser 2 to "ba1234" as denoted with reference numeral 224.

Last, when the edit command 1 is received, the client terminal 133 of the user 3 123 may determine whether the same edit command as the edit command 1 is already applied to the markup language-based document, to which the edit "bc1234" has been applied as denoted with reference numeral 233.

In this case, the client terminal 133 of the user 3 123 may determine whether the same edit command as the edit command 1 is already applied to the markup language-based document, to which the edit "bc1234" has been applied by confirming the unique serial number corresponding to the edit command 1.

Since the same edit command as the edit command 1 is not applied to the markup language-based document, which is displayed through the browser 3 of the client terminal 133 of the user 3 123, the client terminal 133 of the user 3 123 may apply the edits according to the edit command 1 based on the coordinate value, which is defined in the edit command 1 and is associated with the position of the application of the edit command 1 in the markup language-based document, as denoted with reference numeral 234, and change the markup language-based document displayed through the browser 3 to include "bac1234".

That is, the coordinate value defined in the edit command 1 is [1, 1] and the edit command 1 is the edit command commanding to insert "a" to the second left point, so that the client terminal 133 of the user 3 123 may insert "a" to the second left point in "bc1234" displayed through the browser 3 as denoted with reference numeral 233 to change an edit state of the markup language-based document displayed through the browser 3 to "bac1234" as denoted with reference numeral 234.

When the edit command 1 is second extracted from the queue of the buffer and transmitted to the plurality of client terminals 131, 132, and 133, and then the edit command 3 is last extracted from the queue of the buffer, the edit command transmitting unit 115 may determine whether there is an edit command of a previous turn stored earlier than the edit command 3 in the queue of the buffer.

Since the edit command 2 and the edit command 1 are stored earlier than the edit command 3 in the queue of the buffer, the edit command transmitting unit 115 may determine that there is the edit command of the previous turn stored earlier than the edit command 3 in the queue of the buffer, and in this case, the edit command transmitting unit 115 may perform the operational transformation of changing a coordinate value, to which the edit command 3 is to be applied in the markup language-based document, on the edit command 3 based on the coordinate values associated with the positions of the application of the edit command 2 and the edit command 1, which are the edit commands of the previous turns, in the markup language-based document.

In relation to this, in the situation where the coordinate value defined in the edit command 2 is [0, 0] and the coordinate value defined in the edit command 1 is [1, 1] according to the performance of the operational transformation, the coordinate value defined in the edit command 3 is [0, 0], so that in order to prevent the coordinate value defined in the edit command 3 from overlapping the coordinate values defined in the edit commands 2 and 1, the edit command transmitting unit 115 may change, for the edit command 3, the coordinate value, to which the edit command 3 is applied, to a coordinate value [2, 2] by shifting the coordinate value, to which the edit command 3 is applied, by shifting two spaces in the right direction.

That is, in order to prevent the points of the application of the edit command 2 commanding to insert "b" to the leftmost point and the edit command 1 commanding to insert "a" to the second left point in the markup language-based document from overlapping the point of the application of the edit command 3 commanding to insert "c" to the leftmost point, the edit command transmitting unit 115 may perform the operational transformation of changing the point of the application to a point shifted by two spaces from the leftmost point in the right direction on the edit command 3, which is latest stored in the queue of the buffer.

Then, the edit command transmitting unit 115 may transmit the edit command 3, of which the operational transformation is completed, to each of the plurality of client terminals 131, 132, and 133.

In this case, when the edit command 3 is received, the client terminal 131 of the user 1 121 may determine whether the same edit command as the edit command 3 is already applied to the markup language-based document, to which the edit "ba1234" has been applied as denoted with reference numeral 214.

In this case, the client terminal 131 of the user 1 121 may determine whether the same edit command as the edit command 3 is already applied to the markup language-based document, to which the edit "ba1234" has been applied by confirming a unique serial number corresponding to the edit command 3.

Since the same edit command as the edit command 3 is not applied to the markup language-based document, which is displayed through the browser 1 of the client terminal 131 of the user 1 121, the client terminal 131 of the user 1 121 may apply the edits according to the edit command 3 based on the coordinate value, which is defined in the edit command 3 and is associated with the position of the application of the edit command 3 in the markup language-based document, as denoted with reference numeral 215, and change the markup language-based document displayed through the browser 1 to include "bac1234".

That is, the coordinate value defined in the edit command 3 is [2, 2] and the edit command 3 is the edit command commanding to insert "c" to the third left point, so that the client terminal 131 of the user 1 121 may insert "c" to the third left point in "ba1234" displayed through the browser 1 as denoted with reference numeral 214 to change an edit state of the markup language-based document displayed through the browser 1 to "bac1234" as denoted with reference numeral 215.

In the meantime, when the edit command 3 is received, the client terminal 132 of the user 2 122 may determine whether the same edit command as the edit command 3 is already applied to the markup language-based document, to which the edit "ba1234" has been applied as denoted with reference numeral 224.

In this case, the client terminal 132 of the user 2 122 may determine whether the same edit command as the edit command 3 is already applied to the markup language-based document, to which the edit "ba1234" has been applied by confirming the unique serial number corresponding to the edit command 3.

Since the same edit command as the edit command 3 is not applied to the markup language-based document, which is displayed through the browser 2 of the client terminal 132 of the user 2 122, the client terminal 132 of the user 2 122 may apply the edits according to the edit command 3 based on the coordinate value, which is defined in the edit command 3 and is associated with the position of the application of the edit command 3 in the markup language-based document, as denoted with reference numeral 225, and change the markup language-based document displayed through the browser 2 to include "bac1234".

That is, the coordinate value defined in the edit command 3 is [2, 2] and the edit command 3 is the edit command commanding to insert "a" to the third left point, so that the client terminal 132 of the user 2 122 may insert "c" to the third left point in "ba1234" displayed through the browser 2 as denoted with reference numeral 224 to change an edit state of the markup language-based document displayed through the browser 2 to "bac1234" as denoted with reference numeral 225.

Last, when the edit command 3 is received, the client terminal 133 of the user 3 123 may determine whether the same edit command as the edit command 3 is already applied to the markup language-based document, to which the edit "bac1234" has been applied as denoted with reference numeral 234.

In this case, the client terminal 133 of the user 3 123 may determine whether the same edit command as the edit command 3 is already applied to the markup language-based document, to which the edit "bac1234" has been applied by confirming the unique serial number corresponding to the edit command 3.

Since the same edit command as the edit command 3 has been already autonomously applied to the markup language-based document displayed through the browser 3 of the client terminal 133 of the user 3 123 as denoted with the reference numeral 232, it is not necessary to apply the received edit command 3 to the markup language-based document again, so that the client terminal 133 of the user 3 123 may discard the received edit command 3 to maintain the edit state "bac1234" without a change as denoted with reference numeral 235.

As described above, in the document cooperation supporting apparatus 110 for supporting the simultaneous edit of the document according to the present invention, when simultaneously generated edit commands are received from the plurality of client terminals 131, 132, and 133, respectively, the edit commands are sequentially transmitted to each of the plurality of client terminals 131, 132, and 133 based on a reception sequence of the edit commands, and the operational transformation is performed on the edit commands having the later reception sequence, so that when each of the plurality of client terminals 131, 132, and 133 applies the edit commands sequentially received from the document cooperation supporting apparatus 110 for supporting the simultaneous edit of the document to the markup language-based document stored in each of the plurality of client terminals 131, 132, and 133, all of the edit states of the markup language-based document displayed through the browsers of the plurality of client terminals 131, 132, and 133 equally become "bac1234" as denoted with reference numerals 215, 225, and 235, thereby enabling the user 1 121, the user 2 122, and the user 3 123 to simultaneously edit one document.

Figure 2:
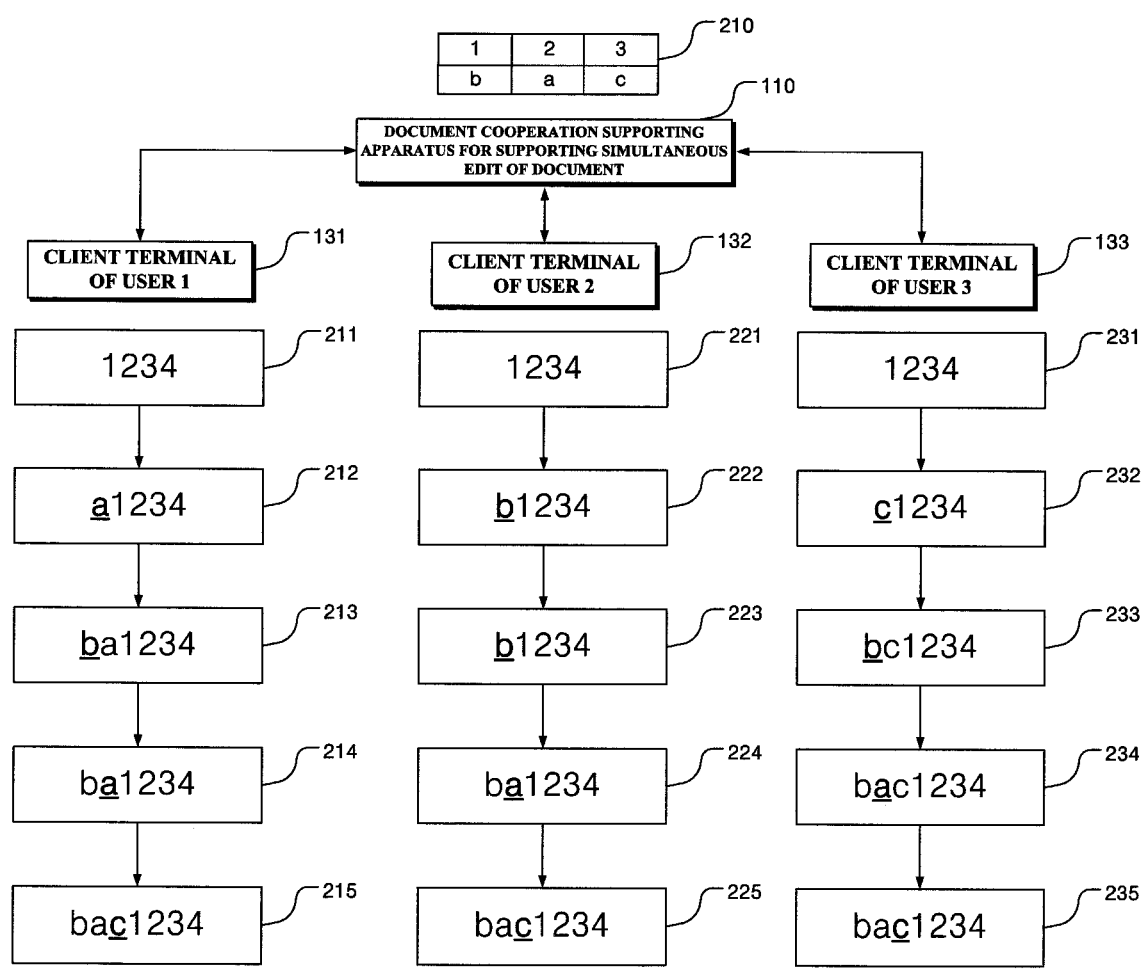
FIG. 2 is a diagram illustrating an operation of the document cooperation supporting apparatus for supporting the simultaneous edit of the document according to the exemplary embodiment of the present invention.

In the foregoing description, the operation of the document cooperation supporting apparatus 110 for supporting the simultaneous edit of the document according to the exemplary embodiment of the present invention has been described in detail with the example with reference to FIG. 2. In the exemplary embodiment of FIG. 2, it is assumed that each of the plurality of client terminals 131, 132, and 133 simultaneously edits the document based on the web-page through the browser installed in each of the plurality of client terminals 131, 132, and 133, so that the present invention has been described based on the situation, in which each of the plurality of client terminals 131, 132, and 133 receives a markup language-based document from the document cooperation supporting apparatus 110 for supporting the simultaneous edit of the document and simultaneously edits the markup language-based document, as an example. However, the exemplary embodiment of FIG. 2, in which the simultaneous edit is performed by using the markup language-based document, is simply the exemplary embodiment of the present invention, and the present invention is not limited to a markup language-based document, and is applicable to all of the documents having an electronic form, such as a document utilized in a general installed document writing program having an extension, such as "docx" and "hwp".

Figure 3:
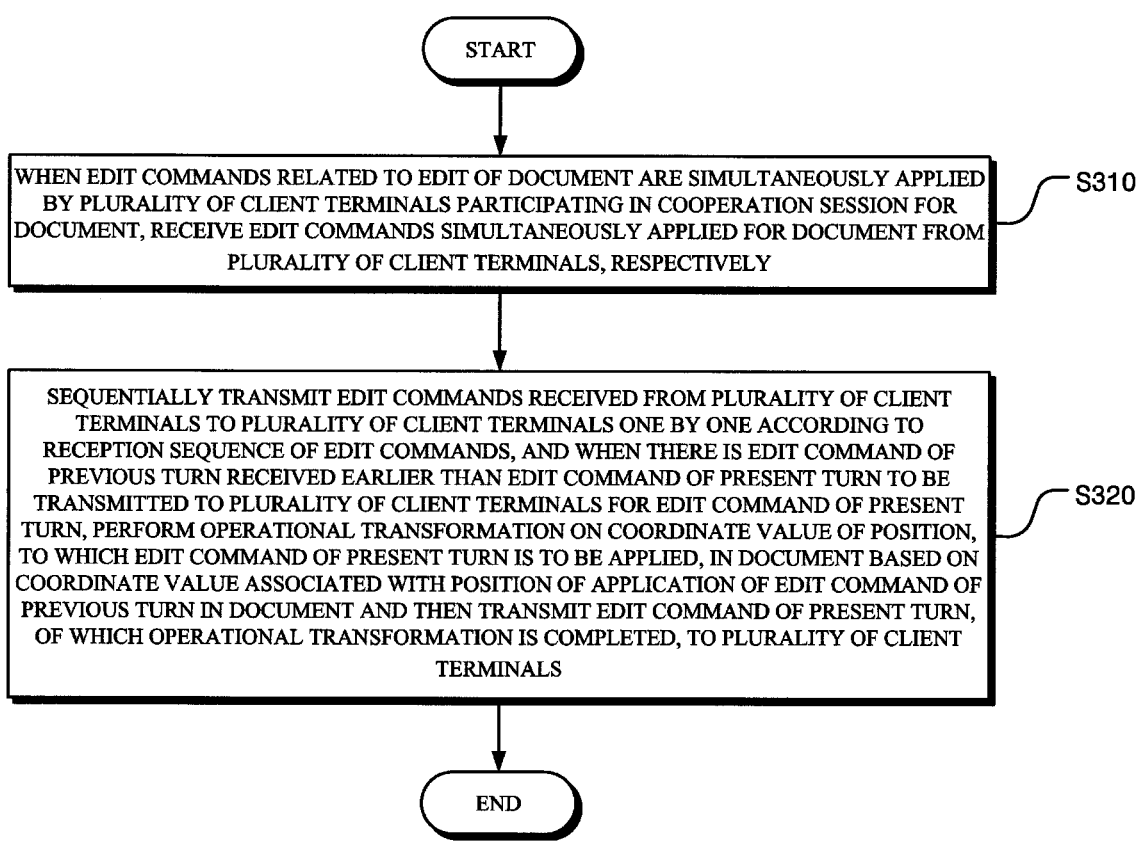
FIG. 3 is a flowchart illustrating an operating method of the document cooperation supporting apparatus for supporting the simultaneous edit of the document according to an exemplary embodiment of the present invention.

FIG. 3 is a flowchart illustrating an operating method of the document cooperation supporting apparatus for supporting the simultaneous edit of the document according to an exemplary embodiment of the present invention.

In operation S310, when edit commands related to an edit of a document are simultaneously applied by a plurality of client terminals participating in a cooperation session of the document, the edit commands (in each of the edit commands, a coordinate value associated with a position of an application of each edit command in the document is defined) simultaneously applied for the document are received from the plurality of client terminals, respectively.

In operation S320, the edit commands received from the plurality of client terminals, respectively, are sequentially transmitted to the plurality of client terminals one by one according to a reception sequence of the edit commands, and when, for an edit command of a present turn to be transmitted to the plurality of client terminals, there is an edit command of a previous turn that is received earlier than the edit command of the present turn, an operational transformation is performed on a coordinate value of a position, to which the edit command of the present turn is to be applied in the document, based on a coordinate value associated with a position of an application of the edit command of the previous turn in the document, and then the edit command of the present turn, of which the operational transformation is completed, is transmitted to the plurality of client terminals.

In this case, according to the exemplary embodiment of the present invention, the operation S320 may include storing the edit commands received from the plurality of client terminals, respectively, in a queue of a buffer based on the reception sequence of the edit commands, when all of the edit commands are stored in the queue of the buffer, extracting the edit commands from the queue of the buffer according to a storage sequence in the queue of the buffer one by one, and transmitting the edit commands extracted one by one to the plurality of client terminals whenever the edit commands are extracted one by one from the queue of the buffer, in which when there is an edit command of the previous turn stored earlier in the queue of the buffer than an edit command of the present turn for the edit command of the present turn to be transmitted to the plurality of client terminals, the operational transformation is performed on a coordinate value of a position, to which the edit command of the present turn is to be applied, in the document based on a coordinate value associated with a position of an application of the edit command of the previous turn in the document, and then the edit command of the present turn, of which the operational transformation is completed, is transmitted to the plurality of client terminals.

According to the exemplary embodiment of the present invention, the plurality of client terminals stores the documents within the plurality of client terminals, respectively, and when the edit commands are sequentially received from the document cooperation supporting apparatus for supporting the simultaneous edit of the document one by one, the plurality of client terminals may apply edits according to each of the received edit commands to the documents stored in the plurality of client terminals based on the coordinate value defined in each of the received edit commands and associated with the position of the application of each of the edit commands in the document.

In this case, according to the exemplary embodiment of the present invention, when the edit commands are simultaneously applied by users of the plurality of client terminals for the document stored in each of the plurality of client terminals, each of the plurality of client terminals may autonomously apply edits according to the edit command applied by each of the users of the plurality of client terminals to the document stored in each of the plurality of client terminals, and then each of the plurality of client terminals may transmit the edit command applied by each of the users to the document cooperation supporting apparatus for supporting the simultaneous edit of the document.

In this case, according to the exemplary embodiment of the present invention, when the edit commands are sequentially received one by one from the document cooperation supporting apparatus for supporting the simultaneous edit of the document, each of the plurality of client terminals may determine whether there is the same edit command as the edit command, which has been already autonomously applied to the document stored in each of the plurality of client terminals, among the received edit commands, and when it is determined that there is the same edit command, each of the plurality of client terminals may exclude the same edit command from the received edit commands, and then apply the edits according to the received edit commands to the document stored in each of the plurality of client terminals based on a coordinate value associated with a position of an application of each of the edit command in the document defined in each of the received edit commands.

In the foregoing description, the operating method of the document cooperation supporting apparatus for supporting the simultaneous edit of the document according to the exemplary embodiment of the present invention has been described with reference to FIG. 3. Here, the operating method of the document cooperation supporting apparatus for supporting the simultaneous edit of the document according to the exemplary embodiment of the present invention may correspond to the configuration of the operation of the document cooperation supporting apparatus 110 for supporting the simultaneous edit of the document described with reference to FIGS. 1 and 2, so that a more detailed description thereof will be omitted.

The operating method of the document cooperation supporting apparatus for supporting the simultaneous edit of the document according to the exemplary embodiment of the present invention may be implemented by a computer program stored in a storage medium for executing the method through cooperation with a computer.

The operating method of the document cooperation supporting apparatus for supporting the simultaneous edit of the document according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, limited embodiments, and drawings, such as a specific constituent element, but these are provided for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A method of operating an apparatus for supporting document cooperation, which supports a simultaneous edit of a document, the method comprising:
when edit commands for editing a document are simultaneously applied by a plurality of client terminals participating in an editing session of the document, receiving the edit commands simultaneously applied for the document from the plurality of client terminals, respectively, wherein each of the edit commands includes a coordinate value associated with a position of an application of each edit command in the document; and
sequentially transmitting the received edit commands to the plurality of client terminals; and
when there is an edit command of a previous turn that is received earlier than an edit command of a present turn to be transmitted to the plurality of client terminals, performing an operational transformation on a coordinate value of a position, to which the edit command of the present turn is to be applied in the document, based on a coordinate value associated with a position of an application of the edit command of the previous turn in the document, and then transmitting the edit command of the present turn, of which the operational transformation is completed, to the plurality of client terminals,
wherein the transmitting of the edit commands to the plurality of client terminals includes:
storing all of the edit commands received from the plurality of client terminals in a single queue of a buffer based on a reception sequence of the edit commands for a predetermined period of time;
extracting the edit commands one by one from the single queue of the buffer according to a storage sequence in the single queue of the buffer after all of the edit commands are stored in the single queue of the buffer for the predetermined period of time;
sequentially transmit the extracted edit commands one by one according to the reception sequence of the edit commands to all of the client terminals participating in the editing session, whenever the edit commands are extracted one by one from the single queue of the buffer; and
when there is the edit command of the previous turn stored earlier in the single queue of the buffer than the edit command of the present turn to be transmitted to the plurality of client terminals, perform the operational transformation on the coordinate value of the position, to which the edit command of the present turn is to be applied, in the document based on the coordinate value associated with the position of the application of the edit command of the previous turn in the document, and then transmit the edit command of the present turn, of which the operational transformation is completed, to the plurality of client terminals,
wherein each of the plurality of client terminals is configured to:
while receiving the edit commands transmitted from the edit command processing unit, determine whether there is the same edit command as an edit command which has been already applied to a document stored in each of the plurality of client terminals, among the received edit commands; and
when it is determined that there is the same edit command, exclude the same edit command from the received edit commands so as to not be applied to the document stored in each of the plurality of client terminals, and wherein, to determine and process the same edit command among the received edit commands, each of the plurality of client terminals is configured to:

whenever the edit command is applied by each of the plurality of client terminals, generate a unique serial number for the edit command, and transmit the unique serial number along with the edit command to the document cooperation supporting apparatus, wherein the unique serial numbers are generated for and assigned to all of the edit commands applied by the plurality of the client terminals, and all of the unique serial numbers generated by the plurality of client terminals are different from one another;

receive all of the edit commands applied by the plurality of client terminals and corresponding unique serial numbers which are unchanged, from the document cooperation supporting apparatus, wherein all of the received edit commands include the unique serial numbers, respectively;

compare a unique serial number of the edit command which has been already applied to the document stored in each of the plurality of client terminals with the unique serial numbers of the received edit commands; and apply to the document in each client terminal, a received edit command having a unique serial number not matching the unique serial number of edit command which has been already applied, and discard a received edit command having a unique serial number matching the unique serial number of the edit command which has been already applied.

2. The method of claim 1, wherein each of the plurality of client terminals stores the documents within each of the plurality of client terminals, and when the edit commands are sequentially received from the document cooperation supporting apparatus one by one, each of the plurality of client terminals applies edits according to each of the received edit commands to the document stored in each of the plurality of client terminals based on the coordinate value defined in each of the received edit commands and associated with the position of the application of each of the edit commands in the document.

3. The method of claim 1, wherein when the edit commands are simultaneously applied by users of the plurality of client terminals for the document stored in each of the plurality of client terminals, each of the plurality of client terminals autonomously applies edits according to the edit command applied by each of the users of the plurality of client terminals to the document stored in each of the plurality of client terminals, and then each of the plurality of client terminals transmits the edit command applied by each of the users to the document cooperation supporting apparatus.

4. A non-transitory computer readable recording medium in which a program for executing a method of operating an apparatus for supporting document cooperation, which supports a simultaneous edit of a document is recorded, the method comprising:

when edit commands for editing a document are simultaneously applied by a plurality of client terminals participating in an editing session of the document, receiving the edit commands simultaneously applied for the document from the plurality of client terminals, respectively, wherein each of the edit commands includes a coordinate value associated with a position of an application of each edit command in the document; and sequentially transmitting the received edit commands to the plurality of client terminals; and when there is an edit command of a previous turn that is received earlier than an edit command of a present turn to be transmitted to the plurality of client terminals, performing an operational transformation on a coordinate value of a position, to which the edit command of the present turn is to be applied in the document, based on a coordinate value associated with a position of an application of the edit command of the previous turn in the document, and then transmitting the edit command of the present turn, of which the operational transformation is completed, to the plurality of client terminals, wherein the transmitting of the edit commands to the plurality of client terminals includes:

storing all of the edit commands received from the plurality of client terminals in a single queue of a buffer based on a reception sequence of the edit commands for a predetermined period of time;

extracting the edit commands one by one from the single queue of the buffer according to a storage sequence in the single queue of the buffer after all of the edit commands are stored in the single queue of the buffer for the predetermined period of time;

sequentially transmit the extracted edit commands one by one according to the reception sequence of the edit commands to all of the client terminals participating in the editing session, whenever the edit commands are extracted one by one from the single queue of the buffer; and when there is the edit command of the previous turn stored earlier in the single queue of the buffer than the edit command of the present turn to be transmitted to the plurality of client terminals, perform the operational transformation on the coordinate value of the position, to which the edit command of the present turn is to be applied, in the document based on the coordinate value associated with the position of the application of the edit command of the previous turn in the document, and then transmit the edit command of the present turn, of which the operational transformation is completed, to the plurality of client terminals, wherein each of the plurality of client terminals is configured to:

while receiving the edit commands transmitted from the edit command processing unit, determine whether there is the same edit command as an edit command which has been already applied to a document stored in each of the plurality of client terminals, among the received edit commands; and when it is determined that there is the same edit command, exclude the same edit command from the received edit commands so as not to be applied to the document stored in each of the plurality of client terminals, and wherein, to determine and process the same edit command among the received edit commands, each of the plurality of client terminals is configured to:

whenever the edit command is applied by each of the plurality of client terminals, generate a unique serial number for the edit command, and transmit the unique serial number along with the edit command to the document cooperation supporting apparatus, wherein the unique serial numbers are generated for and assigned to all of the edit commands applied by the plurality of the client terminals, and all of the unique serial numbers generated by the plurality of client terminals are different from one another;

receive all of the edit commands applied by the plurality of client terminals and corresponding unique serial numbers which are unchanged, from the document cooperation supporting apparatus, wherein all of the received edit commands include the unique serial numbers, respectively;

compare a unique serial number of the edit command which has been already applied to the document stored in each of the plurality of client terminals with the unique serial numbers of the received edit commands; and apply to the document in each client terminal, a received edit command having a unique serial number not matching the unique serial number of edit command which has been already applied, and discard a received edit command having a unique serial number matching the unique serial number of the edit command which has been already applied.

5. An apparatus for supporting document cooperation, which supports a simultaneous edit of a document, the apparatus comprising:

an edit command receiving unit configured to, when edit commands for editing a document are simultaneously applied by a plurality of client terminals participating in an editing session of the document, receive the edit commands simultaneously applied for the document from the plurality of client terminals, respectively, wherein each of the edit commands includes a coordinate value associated with a position of an application of each edit command in the document; and an edit command processing unit configured:

sequentially transmit the received edit commands to the plurality of client terminals; and when there is an edit command of a previous turn that is received earlier than an edit command of a present turn to be transmitted to the plurality of client terminals, perform an operational transformation on a coordinate value of a position, to which the edit command of the present turn is to be applied, in the document, based on a coordinate value associated with a position of an application of the edit command of the previous turn in the document, and then transmit the edit command of the present turn, of which the operational transformation is completed, to the plurality of client terminals, wherein the edit command processing unit includes:

an edit command storing unit, which stores all of the edit commands received from the plurality of client terminals in a single queue of a buffer based on a reception sequence of the edit commands for a predetermined period of time; and an edit command extracting unit, which extracts the edit commands one by one from the single queue of the buffer according to a storage sequence in the single queue of the buffer after all of the edit commands are stored in the single queue of the buffer for the predetermined period of time; and an edit command transmitting unit configured to:

sequentially transmit the extracted edit commands one by one according to the reception sequence of the edit commands to all of the client terminals participating in the editing session, whenever the edit commands are extracted one by one from the single queue of the buffer; and when there is the edit command of the previous turn stored earlier in the single queue of the buffer than the edit command of the present turn to be transmitted to the plurality of client terminals, perform the operational transformation on the coordinate value of the position, to which the edit command of the present turn is to be applied, in the document based on the coordinate value associated with the position of the application of the edit command of the previous turn in the document, and then transmit the edit command of the present turn, of which the operational transformation is completed, to the plurality of client terminals, wherein each of the plurality of client terminals is configured to:

while receiving the edit commands transmitted from the edit command processing unit, determine whether there is the same edit command as an edit command which has been already applied to a document stored in each of the plurality of client terminals, among the received edit commands; and when it is determined that there is the same edit command, exclude the same edit command from the received edit commands so as not to be applied to the document stored in each of the plurality of client terminanls, and wherein, to determine and process the same edit command among the received edit commands, each of the plurality of client terminals is configured to:

whenever the edit command is applied by each of the plurality of client terminals, generate a unique serial number for the edit command, and transmit the unique serial number along with the edit command to the document cooperation supporting apparatus, wherein the unique serial numbers are generated for and assigned to all of the edit commands applied by the plurality of the client terminals, and all of the unique serial numbers generated by the plurality of client terminals are different from one another;

receive all of the edit commands applied by the plurality of client terminals and corresponding unique serial numbers which are unchanged, from the document cooperation supporting apparatus, wherein all of the received edit commands include the unique serial numbers, respectively;

compare a unique serial number of the edit command which has been already applied to the document stored in each of the plurality of client terminals with the unique serial numbers of the received edit commands; and apply to the document in each client terminal, a received edit command having a unique serial number not matching the unqiue serial number of edit command which has been already applied, and discard a received edit command having a unique serial number matching the unique serial number of the edit command which has been already applied.

6. The apparatus of claim 5, wherein each of the plurality of client terminals stores the documents within each of the plurality of client terminals, and when the edit commands are sequentially received from the document cooperation supporting apparatus one by one, each of the plurality of client terminals applies edits according to each of the received edit commands to the document stored in each of the plurality of client terminals based on the coordinate value defined in each of the received edit commands and associated with the position of the application of each of the edit commands in the document.

7. The apparatus of claim 5, wherein when the edit commands are simultaneously applied by users of the plurality of client terminals for the document stored in each of the plurality of client terminals, each of the plurality of client terminals autonomously applies edits according to the edit command applied by each of the users of the plurality of client terminals to the document stored in each of the plurality of client terminals, and then each of the plurality of client terminals transmits the edit command applied by each of the users to the document cooperation supporting apparatus.

\* \* \* \* \*